United States Patent
Rosen et al.

(10) Patent No.: US 12,444,202 B2
(45) Date of Patent: Oct. 14, 2025

(54) METHOD AND SYSTEM FOR ESTIMATING A DRIVABLE SURFACE

(71) Applicant: ZENUITY AB, Gothenburg (SE)

(72) Inventors: Erik Rosen, Alingsås (SE); Nicholas Wickström, Halmstad (SE); Peter Hall, Linköping (SE); Mattias Brännström, Gothenburg (SE); Ognjan Hedberg, Stenungsund (SE)

(73) Assignee: ZENUITY AB, Gothenburg (SE)

( * ) Notice: Subject to any disclaimer, the term of this patent is extended or adjusted under 35 U.S.C. 154(b) by 503 days.

(21) Appl. No.: 17/622,284

(22) PCT Filed: Jun. 25, 2020

(86) PCT No.: PCT/EP2020/067817
§ 371 (c)(1),
(2) Date: Dec. 23, 2021

(87) PCT Pub. No.: WO2020/260455
PCT Pub. Date: Dec. 30, 2020

(65) Prior Publication Data
US 2022/0262136 A1    Aug. 18, 2022

(30) Foreign Application Priority Data
Jun. 27, 2019   (EP) .................................. 19182994

(51) Int. Cl.
*G06V 20/56*        (2022.01)
*B60W 40/06*        (2012.01)
(Continued)

(52) U.S. Cl.
CPC ............ *G06V 20/56* (2022.01); *G01B 21/30* (2013.01); *G01S 13/931* (2013.01); *G06V 10/54* (2022.01);
(Continued)

(58) Field of Classification Search
None
See application file for complete search history.

(56) References Cited

U.S. PATENT DOCUMENTS

| | | | |
|---|---|---|---|
| 9,139,204 B1* | 9/2015 | Zhao | B60W 40/06 |
| 2010/0098290 A1* | 4/2010 | Zhang | B60W 30/00 |
| | | | 701/41 |

(Continued)

FOREIGN PATENT DOCUMENTS

| | | |
|---|---|---|
| CN | 108372856 A | 8/2018 |
| CN | 108985158 A | 12/2018 |

(Continued)

OTHER PUBLICATIONS

R. Matthaei, G. Bagschik, J. Rieken and M. Maurer, "Stationary urban environment modeling using multi-layer-grids," 17th International Conference on Information Fusion (Fusion), Salamanca, Spain, 2014, pp. 1-7. (Year: 2014).*

(Continued)

*Primary Examiner* — Faris S Almatrahi
*Assistant Examiner* — Selena M Jin
(74) *Attorney, Agent, or Firm* — Sage Patent Group (57) ABSTRACT

The present disclosure relates to a control device and method for estimating a drivable space in a surrounding environment of a vehicle. In particular, the disclosure relates to a "free space estimation" solution with reduced validation effort. The control device includes one or more processors adapted to obtain sensor data, determine a surface flatness MF and a surface texture MR of at least one portion of the surrounding environment by means of two independent algorithms, and defining a drivable space based on obtained values.

8 Claims, 5 Drawing Sheets

(51) Int. Cl.
  *G01B 21/30* (2006.01)
  *G01S 13/931* (2020.01)
  *G06V 10/54* (2022.01)
  *G06V 10/80* (2022.01)

(52) U.S. Cl.
  CPC .......... *G06V 10/806* (2022.01); *G06V 20/588* (2022.01); *B60W 40/06* (2013.01); *B60W 2420/403* (2013.01); *B60W 2420/408* (2024.01)

(56) References Cited

U.S. PATENT DOCUMENTS

| | | | | |
|---|---|---|---|---|
| 2013/0079990 | A1* | 3/2013 | Fritsch | G06V 20/588 701/41 |
| 2015/0324649 | A1* | 11/2015 | Grewe | G06V 20/588 382/104 |
| 2015/0344037 | A1* | 12/2015 | Siegel | B60W 50/0097 73/9 |
| 2016/0232413 | A1* | 8/2016 | Ito | G06V 20/588 |
| 2017/0039436 | A1* | 2/2017 | Chen | G06V 10/454 |
| 2019/0056748 | A1* | 2/2019 | Budihal | G05D 1/0253 |
| 2019/0085649 | A1 | 3/2019 | Evans | |
| 2019/0164018 | A1* | 5/2019 | Zhu | G05D 1/0248 |
| 2020/0250984 | A1* | 8/2020 | Kundu | B60W 10/20 |

FOREIGN PATENT DOCUMENTS

| | | |
|---|---|---|
| CN | 109421738 A | 3/2019 |
| CN | 109785431 A | 5/2019 |
| EP | 3444693 A1 | 2/2019 |

OTHER PUBLICATIONS

M. A. H. Ali and M. Mailah, "Path Planning and Control of Mobile Robot in Road Environments Using Sensor Fusion and Active Force Control," in IEEE Transactions on Vehicular Technology, vol. 68, No. 3, pp. 2176-2195, Mar. 2019, doi: 10.1109/TVT.2019.2893878. (Year: 2019).*

International Search Report and Written Opinion mailed Sep. 23, 2020 for International Application No. PCT/EP2020/067817, 12 pages.

Office Action mailed Jan. 31, 2024 for European Patent Application No. 20734912.7, 6 pages.

Roncancio, Henry et al.; "Traversability Analysis Using Terrain Mapping and Online-trained Terrain Type Classifier"; 2014 IEEE Intelligent Vehicles Symposium (IV); Jun. 8-11, 2014; Dearborn, Michigan, USA; pp. 1239-1244; XP032620227; 6 pages.

Schilling, Fabian et al.; "Geometric and Visual Terrain Classification for Autonomous Mobile Navigation"; 2017 IEEE/RSJ International Conference on Intelligent Robots and Systems (IROS); Sep. 24-28, 2017; pp. 2678-2684; XP033266243; 7 pages.

Office Action mailed Dec. 28, 2024 for Chinese Patent Application No. 202080047261.2, 17 pages.

* cited by examiner

METHOD AND SYSTEM FOR ESTIMATING A DRIVABLE SURFACE

CROSS-REFERENCE TO RELATED APPLICATIONS

This application is a 35 U.S.C § 371 national stage application for International Application No. PCT/EP2020/067817, entitled "METHOD AND SYSTEM FOR ESTIMATING A DRIVABLE SURFACE", filed on Jun. 25, 2020, which itself claims priority to European Patent Application No. 19182994.4, entitled "METHOD AND SYSTEM FOR ESTIMATING A DRIVABLE SURFACE", filed on Jun. 27, 2019, the disclosures and contents of which are hereby incorporated by reference in their entireties.

TECHNICAL FIELD

The present disclosure generally relates to the field of Advanced Driver-Assistance Systems (ADAS) and Autonomous Driving (AD). In particular, the present disclosure relates to methods and systems for providing a solution for estimating a drivable space in a surrounding environment with reduced validation effort.

BACKGROUND

Autonomous systems (AS) have the ability to act independently of direct human control and in unrehearsed conditions. These systems enables a whole range of applications, such as self-driving cars, humanoid robots and post-delivering drones. However, this increased capability and flexibility comes with a price: The difficulty in assessing reliability and safety of autonomous systems.

Traditional testing methods fall short of providing the desired standard levels, mainly due to the combinatorial explosion of possible situations to be analysed. There are strict requirements to ensure that autonomous systems are safe and reliable. The safety standards enforces the autonomous systems to operate without harmful states and the reliability requirement enforces the system to deliver services as specified. These requirements are generally associated with a low threshold of system failures, i.e. high probability of failure-free operation in a specified environment, which in turn require costly and time-consuming validation and verification of the AS systems.

Accordingly, there is a need for good and efficient ADAS and AD solutions, which enable for efficient validating techniques that can ensure not to exceed the threshold of system failures related to the performance, software and hardware of autonomous systems.

SUMMARY OF THE DISCLOSURE

It is therefore an object of the present disclosure to provide a control device for estimating a drivable space in a surrounding environment of a vehicle, a vehicle comprising such a control device, a method and a computer-readable storage medium, which is more robust than previously known solutions.

It is also an object of the present disclosure to provide a solution for estimating a drivable space in a surrounding environment of a vehicle that reduces a validation effort associated with autonomous driving (AD) and advanced driver-assistance system (ADAS) applications/features.

These objects are achieved by means of a control device for estimating a drivable space in a surrounding environment of a vehicle, a vehicle comprising such a control device, a method and a computer-readable storage medium as defined in the appended claims. The term exemplary is in the present context to be understood as serving as an instance, example or illustration.

According to a first aspect of the present disclosure, there is provided a method for estimating a drivable space in a surrounding environment of a vehicle. The method comprises obtaining sensor data comprising information about the surrounding environment of the vehicle. The method further comprises determining, by means of a first algorithm, a surface flatness of at least one portion of the surrounding environment based on the obtained sensor data in order to obtain a surface flatness parameter. The determined surface flatness parameter is indicative of a presence of a bump, indentation, and/or object on the at least one portion of the surrounding environment. Furthermore, the method comprises determining, by means of a second algorithm, a surface texture of the at least one portion of the surrounding environment based on the obtained sensor data in order to obtain a surface texture parameter. The determined surface texture parameter is indicative of a presence of a road-like appearance of the at least one portion of the surrounding environment. The method further comprises generating a control signal indicative of the presence of drivable space on the at least one portion of the surrounding environment based on the obtained surface flatness parameter and the obtained surface texture parameter.

Another advantage of applying different and independent models is that information on the surface texture and surface flatness from the models is kept separately which makes it possible at a later stage to determine which model predicted the road to be free and drivable. By contrary, if assuming the models are dependent of each other, the information on both models will be lost at an early stage, which is a disadvantage from a validation and development perspective.

The obtained surface flatness parameter and the obtained surface texture parameter of each portion of the surrounding environment may be in the form of a probability value that the portion of the surrounding environment is "flat" and has a road-like appearance, respectively. Thus, given the input (sensor data) the first algorithm is configured to calculate a probability that one or more portions of the surrounding environment are flat, i.e. that there are no obstacles (e.g. other objects, barriers, curbs, etc.). Analogously, given the input (sensor data) the first algorithm is configured to calculate a probability that one or more portions of the surrounding environment are have a road-like appearance (e.g. appearing like pavement and not a grass field). However, the parameters may also be of binary form merely indicating that the portion is flat and/or has a road-like appearance.

It is known that the effort required for arguing and validating an autonomous system in order to fulfil safety requirements is enormous, in particular for Autonomous Driving (AD) in automotive applications. More specifically, one needs to show that the system software and hardware and performance has a probability of dangerous failure rate limit of $10^{-7}$-$10^{-9}$ in order to e.g. fulfil the requirement dictated by the Automotive Safety Integrity Level (ASIL) classification. In other words, one must show that the AD feature will be responsible for one failure or less in $10^9$ active hours. Doing this purely by data is extremely costly and time consuming to the extent that it may even be practically unfeasible.

Thus, the present inventors realized that by utilizing the independence of different sensor modalities or algorithms, a brute force validation effort of $10^9$ h may, in a best case scenario, be reduced by the n-th square root of $10^9$, or at least by several orders of magnitude. Moreover, for autonomous driving, free space determination is a key enabler for safety. Estimating such free space in front and around the vehicle in at least two redundant ways is what is proposed in this disclosure, and serves at least partly to reduce the validation effort for ADAS and AD vehicles.

Further, the determination/estimation of the surface flatness may be based on input from a Laser Imaging Detection and Ranging-, LIDAR, device, a stereo camera, a radar device, and/or a monocular camera. The determination/estimation of the surface texture may be based on input from a monocular camera, stereo camera and/or a Laser Imaging Detection and Ranging-, LIDAR, device. An advantage of using e.g. a LIDAR is that this device is capable of measuring distances in an accurate way.

According to an exemplary embodiment of the present disclosure the method further comprises fusing the obtained surface flatness parameter and the obtained surface texture parameter in order to obtain a combined estimation of the presence of drivable space on the at least one portion of the surrounding environment, and wherein the step of defining the at least one portion of the surrounding environment as drivable space is based on the combined estimation.

Further, according to another exemplary embodiment of the present disclosure the method further comprises forming a first model representation indicative of the obtained surface flatness parameter of a first plurality of portions of the surrounding environment of the vehicle, and forming a second model representation indicative of the obtained surface texture parameter of a second plurality of portions of the surrounding environment of the vehicle. The step of fusing the determined surface flatness parameter with the determined surface texture parameter is performed where the first and second model representations overlap.

Further, in accordance with another exemplary embodiment of the present disclosure, the step of forming the first model representation further comprises for each time sample, updating the surface flatness parameter of a previous time sample based the obtained surface flatness parameter. The step of forming the second model representation further comprises for each time sample, updating the surface texture parameter of a previous time sample with the obtained surface texture parameter, and wherein the updating of the surface flatness parameter and the updating of the surface texture parameter is performed before fusing the obtained surface flatness parameter and the obtained surface texture parameter.

In this context, the updating process may be construed as a "time filtering" processes. In more detail, the time filtering denotes the process of updating the previously "time filtered" measurements from t=0, 1, 2 . . . N−1 with the new measurement from t=N. For each time step one adds/multiplies the measurements from t=N to the model representation containing the sum of all previous measurements. Therefore, in short two matrices are multiplied or added together at each time step, instead of N matrices.

However, alternatively the "time filtering" may be performed after the fusion. Thus, according to another exemplary embodiment of the present disclosure, the step of forming the first model representation further comprises for each time sample, updating the surface flatness parameter of a previous time sample based the obtained surface flatness parameter. The step of forming the second model representation further comprises for each time sample, updating the surface texture parameter of a previous time sample with the obtained surface texture parameter, and wherein the updating of the surface flatness parameter and the updating of the surface texture parameter is performed before fusing the obtained surface flatness parameter and the obtained surface texture parameter.

In order to keep the information provided by each independent model representation (flatness or road-like appearance) at any given time one may introduce a separate layer, counter or the like. In more detail, this layer or counter can keep track of which model "observed" flatness or road surface texture resemblance at which time steps. Thus, in accordance with another exemplary embodiment the method further comprises storing, in a separate layer or a separate counter, the obtained surface flatness parameter and the determined surface texture parameter at each time step. The term counter should in the present context be interpreted broadly, and may for example be in the form of a virtual counter (i.e. a model or algorithm arranged to keep track of a predefined event).

Further, according to a second aspect of the present disclosure there is provided a (non-transitory) computer-readable storage medium for storing one or more programs configured to be executed by one or more processors of a vehicle processing system, the one or more programs comprising instructions for performing the claimed method. With this aspect of the disclosure, similar advantages and preferred features are present as in the previously discussed first aspect of the disclosure, and vice versa.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

Still further, in accordance with a third aspect of the present disclosure, there is provided a control device for estimating a drivable space in a surrounding environment of a vehicle. The control device comprises one or more processors configured to obtain sensor data comprising information about the surrounding environment of the vehicle The one or more processors are further configured determine, by means of a first algorithm, a surface flatness of at least one portion of the surrounding environment based on the obtained sensor data in order to obtain a surface flatness parameter. The determined surface flatness parameter is indicative of a presence of a bump, indentation, and/or object on the at least one portion of the surrounding environment. Furthermore, the processor(s) is/are configured to determine, by means of a second algorithm, a surface texture of the at least one portion of the surrounding environment based on the obtained sensor data in order to obtain a surface texture parameter. The determined surface texture parameter is indicative of a presence of a road-like appearance of the at least one portion of the surrounding environment. Further, the processor(s) is/are configured to generate a control signal indicative of the presence of drivable space on the at least one portion of the surrounding environment based on the obtained surface flatness parameter and the obtained surface texture parameter.

According to a fourth aspect of the present disclosure there is provided a vehicle comprising a perception system comprising one or more sensors adapted to monitor a surrounding environment of the vehicle, and the control device according to any one of the embodiments disclosed herein. With this aspect of the disclosure, similar advantages and preferred features are present as in the previously discussed first aspect of the disclosure, and vice versa.

Further embodiments of the disclosure are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present disclosure will in the following be further clarified with reference to the embodiments described hereinafter.

BRIEF DESCRIPTION OF THE DRAWINGS

Further objects, features and advantages of embodiments of the disclosure will appear from the following detailed description, reference being made to the accompanying drawings, in which.

DETAILED DESCRIPTION

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

The method and control device for estimation of a drivable surface will now be described more fully hereinafter with reference to the accompanying drawings, in which various examples are shown. The accompanying drawings are schematic and simplified for clarity and they merely show details, which may be important for the understanding of the invention, while other details have been left out. The appended patent claims may be embodied in different forms not shown in the accompanying drawings and should not be construed as limited to the examples set forth herein. Rather, these examples are provided so that this disclosure will be thorough and complete, and will fully convey the scope of the appended patent claims to those skilled in the art. In the following description of exemplary embodiments, the same reference numerals denote the same or similar components.

The effort required for arguing and validating an autonomous system in order to fulfil safety requirements is arguably enormous, in particular for Autonomous Driving (AD) in automotive applications. More specifically, one generally needs to show that the system software and hardware and performance has a probability of dangerous failure rate limit of $10^{-7}$-$10^{-9}$ in order to fulfil the requirement as e.g. dictated by the Automotive Safety Integrity Level (ASIL) classification. In other words, one must show that the AD feature will be responsible for one failure or less in $10^9$ active hours. Doing this purely by data is extremely costly and time consuming to the extent that it may even be practically unfeasible. Thus, an AD feature (estimating drivable space) as described in the form of a method and control device in the present disclosure can alleviate some of this validation effort.

The estimation of drivable space of a vehicle, e.g. an AD-vehicle, is performed by monitoring its surrounding environment, such as road portion in front of and around the vehicle. A number of different models or algorithms can be utilized calculate the free space mathematically defined in a state representation such as in an occupancy grid framework.

Figure 1:
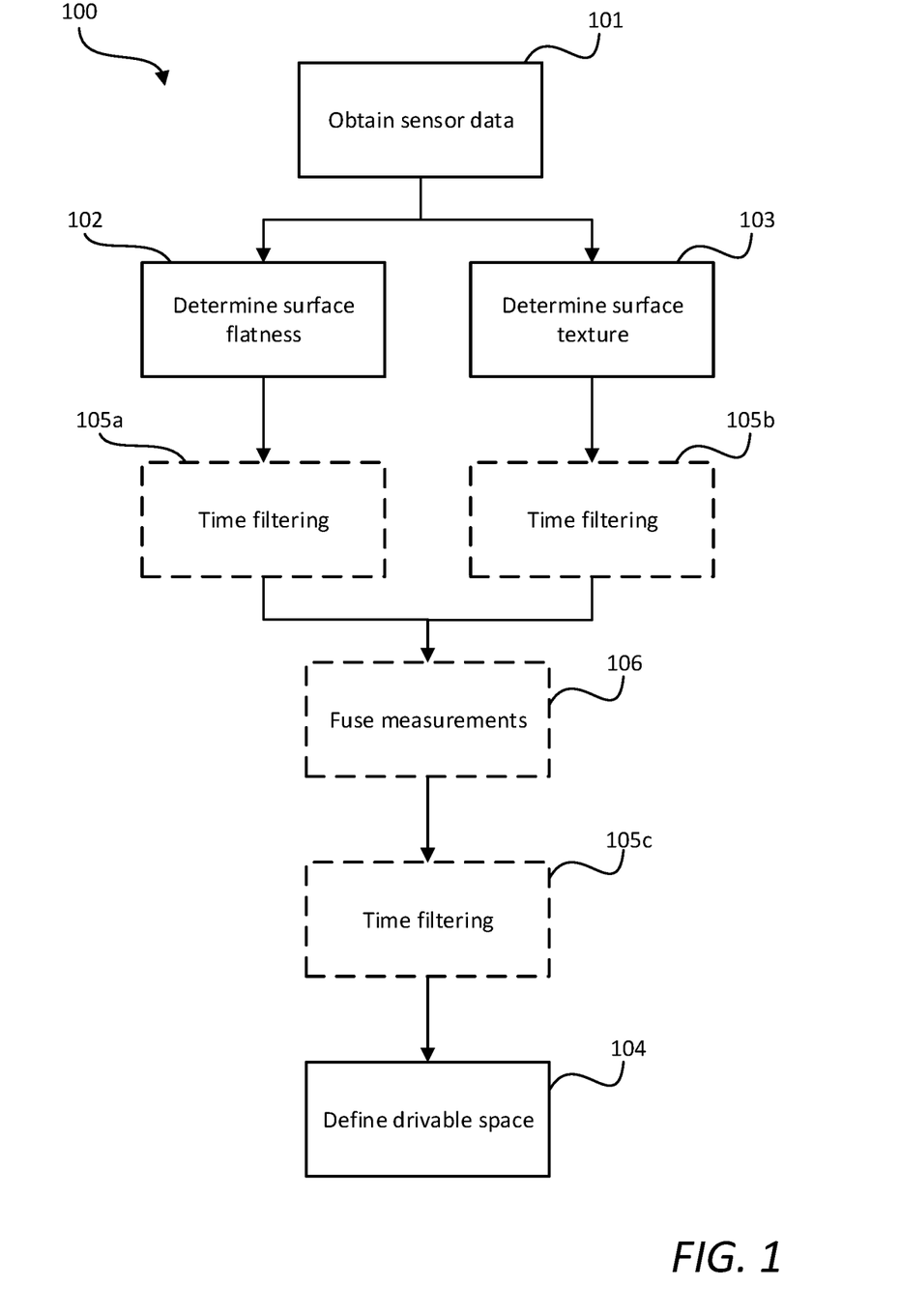
FIG. 1 is a schematic flow chart representation of a method in accordance with an embodiment of the present disclosure.

FIG. 1 is a schematic flow chart representation of a method 100 for estimating a drivable space in a surrounding environment of a vehicle. The method 100 comprises a step of obtaining 101 sensor data from one or more detecting sensors arranged to monitor the surrounding environment of the vehicle. In more detail, the step of obtaining 101 information can be understood as a step of obtaining sensor data from a perception system of the vehicle. A perception system is in the present context to be understood as a system responsible for acquiring raw sensor data from sensors such as cameras, LIDARs and RADARs, ultrasonic sensors, and converting this raw data into scene understanding. Naturally, the sensor data may be obtained 101 directly from one or more suitable sensors (such as e.g. cameras, LIDAR sensors, radars, ultrasonic sensors, etc.). The term obtaining is herein to be interpreted broadly and encompasses receiving, retrieving, collecting, acquiring, and so forth.

Further, the method 100 comprises determining 102 a surface flatness and determining 103 a surface texture of at least one portion of the surrounding environment based on the obtained 101 information. In more detail, the method comprises determining 102, by means of a first algorithm, a surface flatness of at least one portion of the surrounding environment based on the obtained sensor data in order to obtain a surface flatness parameter. The determined surface flatness parameter is indicative of a presence of a bump, indentation, and/or object on the at least one portion of the surrounding environment.

The determining steps 102, 103 are here illustrated as parallel flows to elucidate the fact that the two processes are independent and based on independent models or algorithms. However, naturally, the determining steps 102, 103 may be done sequentially depending on the chosen implementation. The determination 102, 103 may for example be executed as a probability calculation, i.e. a calculation of the probability that an evaluated portion of a surrounding environment is flat and has a road-like texture. Thus, the obtained surface flatness parameters and surface texture parameters may be in the form of probability values.

Further, the method 100 comprises optional steps of time filtering 105a, 105b the measurements 102, 103 from the previous step as indicated by the dashed boxes. In more detail, if one considers a time line where t=[0, 1 ... N−1, N], where a measurement is taken for each discrete time t and N is the size of the time filter. Then, "time filtering" denotes the process of updating the previously time filtered measurements from t=0, 1, 2 ... N−1 with the new measurement from t=N.

Accordingly, the method 100 may comprise forming a first model representation indicative of the obtained surface flatness parameter of a first plurality of portions of the surrounding environment of the vehicle, and for each time sample, updating 105a the surface flatness parameter of a previous time sample based the obtained surface flatness parameter. The surface flatness parameter of the previous time sample is accordingly also a "time filtered" result.

Analogously, the method 100 may comprise forming a second model representation indicative of the obtained surface texture parameter of a second plurality of portions of the surrounding environment of the vehicle, and for each time sample, updating 105b the surface texture parameter of a previous time sample with the obtained surface texture parameter. The surface texture parameter of the previous time sample is accordingly also a "time filtered" result.

Moreover, the method 100 may further comprise a step of fusing 106 the obtained 102, 103 surface flatness and surface texture parameters. In more detail, the method 100 may comprise fusing 106 the obtained surface flatness parameter and the obtained surface texture parameter in order to obtain a combined estimation of the presence of drivable space on the at least one portion of the surrounding environment.

As indicated in the FIG. 1, the time filtering 105c may also be applied after the fusing step 106 as an alternative to before the fusing 106. Accordingly, the method may comprise forming a combined model representation indicative of the obtained estimation of the presence of drivable of a third plurality of portions of the surrounding environment of the vehicle. Moreover, for each time sample, the method 100 may comprise updating 105c the combined estimation of the presence of drivable space of a previous time sample with the obtained combined estimation of the presence of drivable space. The time filtering 105a-c, and the fusion 106 and advantages related thereto will be further discussed in reference to FIGS. 3 and 4.

Moving on, the method comprises a step of defining 104 the at least one portion of the surrounding environment as drivable space based on the determined 101 surface flatness, and the determined 103 surface texture. Naturally, the estimation 104 of the drivable space may be based directly on the obtained 102, 103 independent parameters or indirectly on the obtained 102, 103 independent parameters (i.e. on a combined estimation parameter obtained from the fusion 106).

In accordance with an exemplary embodiment the method 100 utilizes an occupancy grid framework. More specifically, the first model representation and the second model representation are based on an occupancy grid framework such that obtained surface flatness parameter and the obtained surface texture parameter are updated in separate layers or grids in an occupancy grid framework. An example of an occupancy grid framework is shown in FIG. 2.

Figure 2:
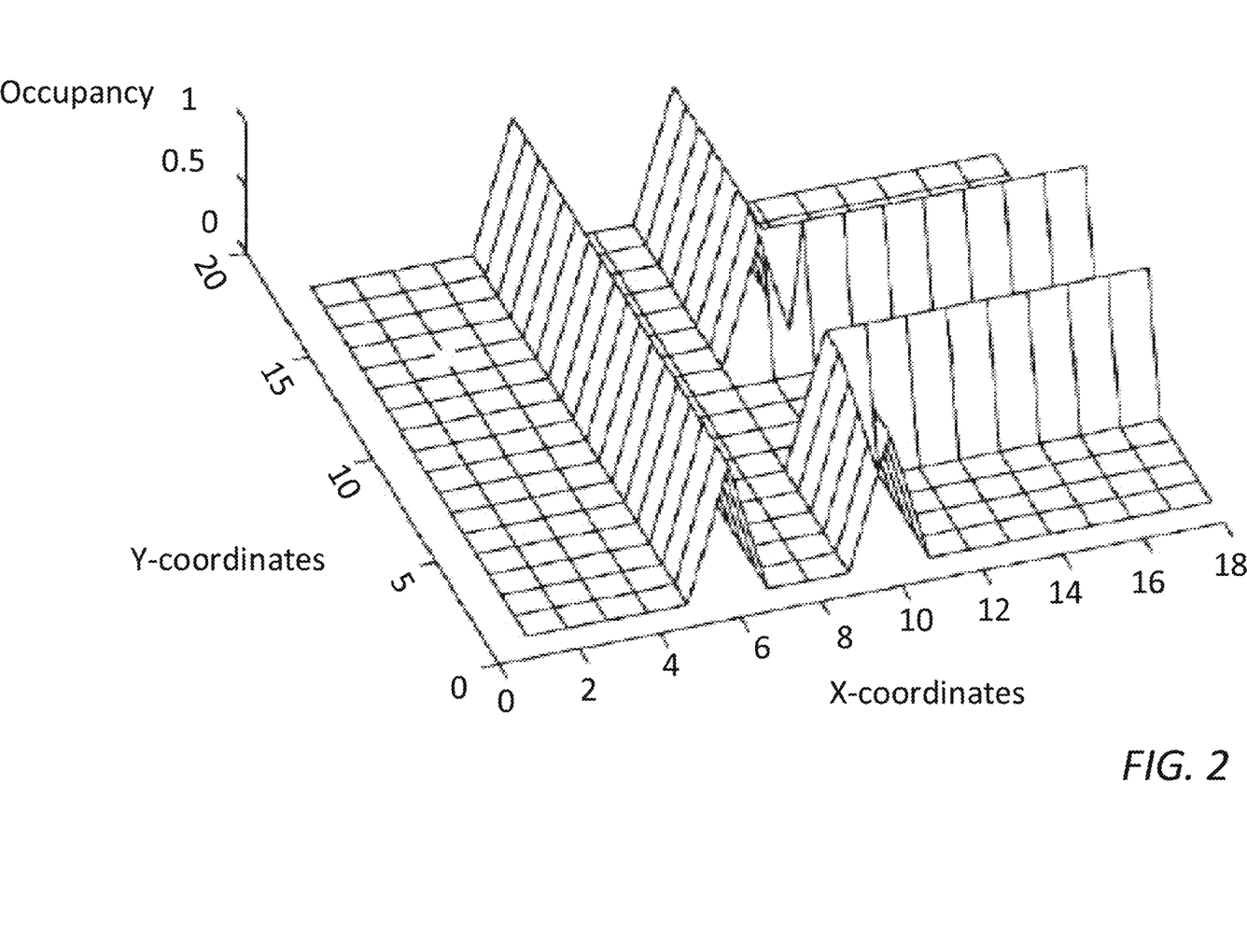
FIG. 2 is a schematic example of an occupancy grid framework.

As illustrated in FIG. 2, the space is represented as a three dimensional image of an occupancy grid mapping the environment. The occupancy grid comprising cells in an evenly spaced field of random binary variables and/or modalities, each representing the presence of an obstacle at that location in the environment. Each cell in the occupancy grid has a value representing the probability of the occupancy of that cell (e.g. a probability of a presence of an object forming an obstacle). Those values that are close to 1 represent a high probability that the cell contains an obstacle. On the opposite, if the value is close to 0, it represents the probability that the cell is not occupied and "obstacle-free". The probability values of the cells can be specified or input as modalities, i.e. raw data used by sensors, such as sound, pressure, temperature, light, etc.

There are two independent models or algorithms for estimating a drivable space that are utilized in this disclosure. However, additional models/algorithms estimating other factors (e.g. sound) may also be used.

The two exemplary algorithms/models can be described as:

First Algorithm: This algorithm is configured to estimate the flatness of the area in front of, or around the vehicle by using different sensor devices. A sensor device capable of estimating the flatness of a surface performs measurements of the surrounding area of a vehicle and sends the measurements to at least one processor to be processed and stored in a storage device. The sensor device may be in the form of a Laser Imaging Detection and Ranging, LIDAR, device, a monocular camera, a stereo camera and a radar device or any other sensor devices capable of estimating the flatness of a surface.

Second Algorithm: This algorithm is configured to estimate the road-like appearance of the area in front and around a vehicle by using sensor devices specifically for measuring the texture of the surface, such as a monocular camera, stereo camera or a Laser Imaging Detection and Ranging-, LIDAR, device. Similarly as for the first algorithm, the measurements are sent to at least one processor in the vehicle and stored in a storage device.

Figure 3:
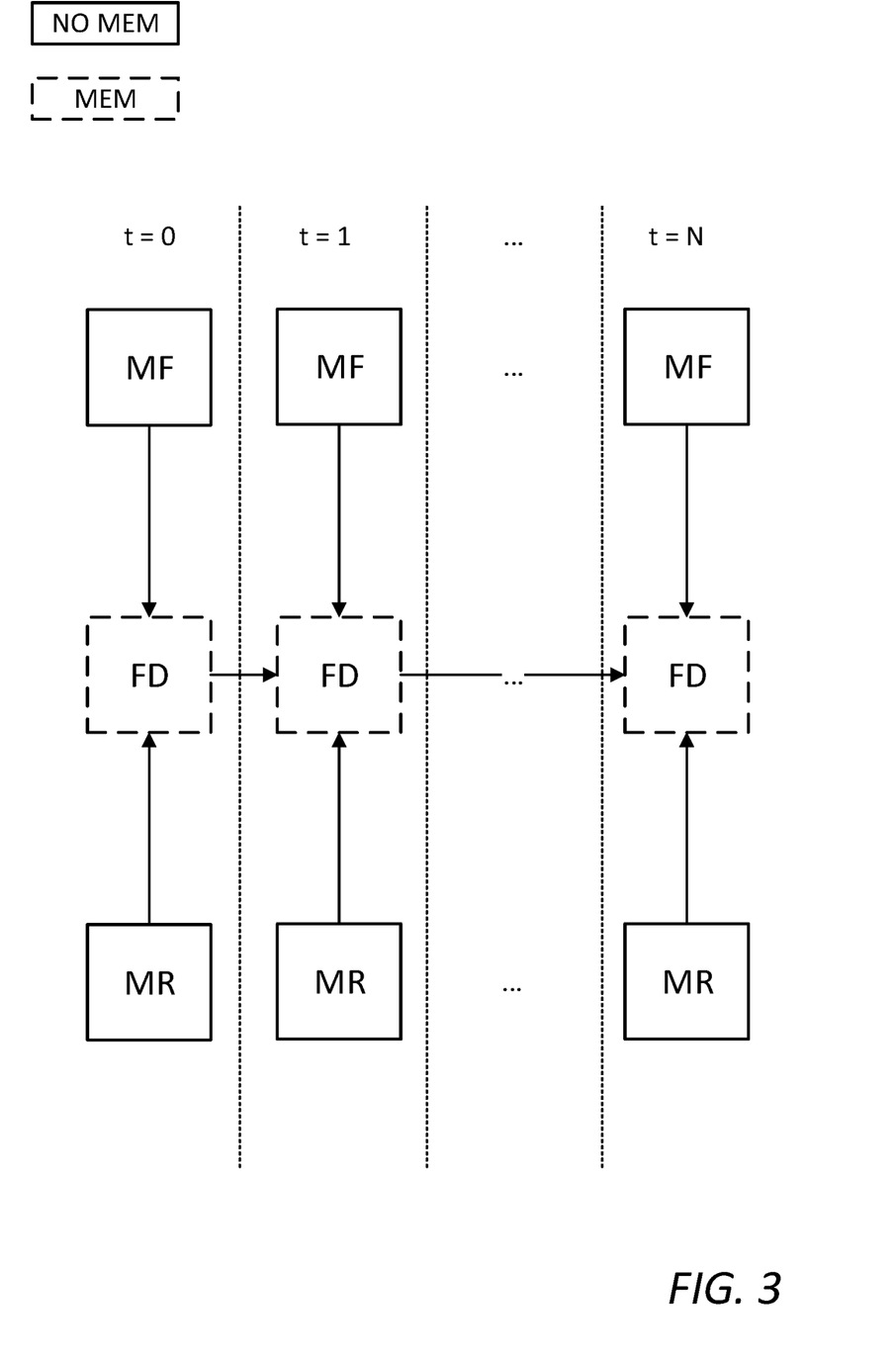
FIG. 3 is a flow chart representation of a method in accordance with an embodiment of the present disclosure.

According to an example embodiment of the present disclosure, the measurements from the drivable surface of the vehicle of the two models are first fused and then time filtered together. In FIG. 3, a flow chart representation of a method applying the post-fusion time filtering is shown.

If one considers a time line where t=[0, 1 ... N−1, N], where a measurement is taken for each discrete time t and N is the size of the time filter. As mentioned, in the present context, "time filtering" denotes the process of updating the previously time filtered measurements from t=0, 1, 2 ... N−1 with the new measurement from t=N. The measurements for determining the surface flatness are denoted as MF (measurement flatness) and the measurements for determining the surface texture are denoted as MR (measurement road-like) in FIG. 3 and FIG. 4.

Figure 4:
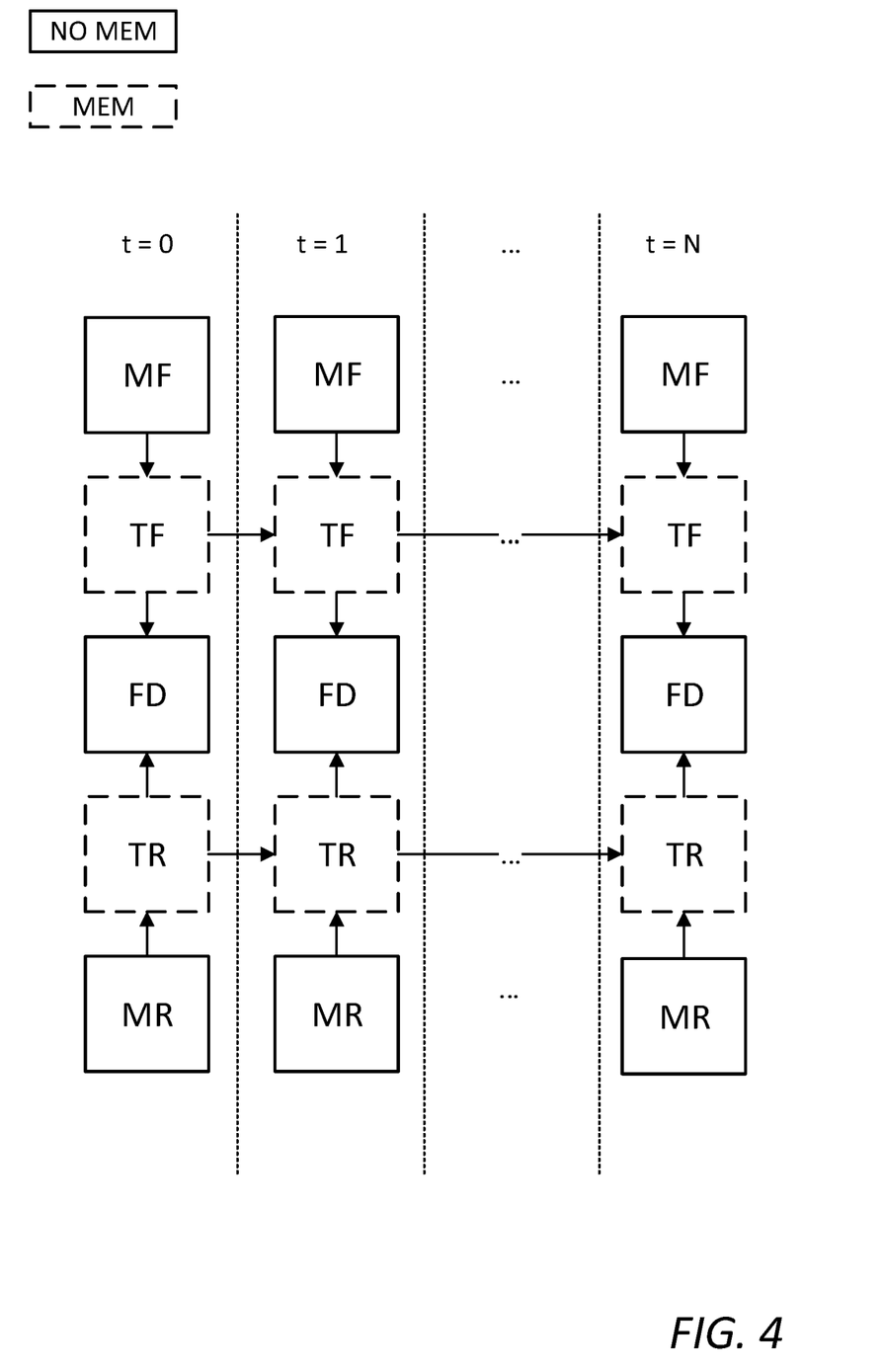
FIG. 4 is flow chart representation of a method according to an embodiment of the present disclosure.

The flatness measurements (MF) may be construed as a step of determining whether the observed area contains a three-dimensional object (i.e. an obstacle), i.e. an object having an extension along the normal of the surface the vehicle is on. The flatness measurements are then processed to be fused with the measurements for determining the texture of the surface and eventually stored. The texture measurements (MR) may be construed as a step of determining whether the observed area has a road-like appearance, i.e. if the observed portion of the surrounding environment resembles a road instead of e.g. a patch of grass. Moreover, the measurements at each time step (MF/MR) are denoted in solid lines as NO MEM, indicating that the measurement results/output are not necessarily stored.

The fused results are then stored (i.e. the combined estimation) in a suitable storage device (i.e. a computer readable storage medium). The fusion is denoted as FD (fused drivable surface) in FIGS. 3 and 4. Accordingly, the fusion results is indicative of a representation of the drivable space in front or around of a vehicle.

After the fusion of the surface flatness parameter and the surface texture parameter, at each time step, the resulting combined estimation is time filtered. In other words, the stored combined estimation from a preceding time step are combined (added, multiplied, or the like depending on chosen framework/application) with the "new" combined estimation in order to obtain a final time-dependent occupancy grid (or any other suitable model representation). Thus, the fusion may be done prior to time filtering, resulting in an occupancy grid (or other representation) which contains the time filtered combined probabilities of a number of cells (in the occupancy grid) or of an area (observed by the sensors/detecting devices) being drivable or not.

Accordingly, in the case illustrated in FIG. 3, the measurements are fused before "time-filtering". A disadvantage of fusing before time filtering is that it is difficult to detect errors in fused data. In more detail, it is difficult to know whether any given cell at any given time t comprises information of an occupancy state or a free state for each applied model or algorithm. The output from the first and second algorithms, when fused, are no longer identifiable so it may be difficult to know which model made an error and when an error in the final result is detected. However, in order to keep such information (what model produced a result of a free or occupied state) one can record, in a separate layer or separate counter, the obtained surface flatness parameter and the obtained surface texture parameter at each time step t. In other words, if such information is important to keep, a new layer, counter, or the like, may be introduced. This layer or counter can keep track of which model observed flatness or road-like resemblance for each portion of the surrounding environment (i.e. for each surface portion of the observed surface around the vehicle) at which time steps.

Accordingly, in an alternative embodiment illustrated in FIG. 4, the time filtering (denoted as TF/TR representing time filtered flatness and time filtered road-like) is performed before the fusion (FD) of the obtained surface flatness and surface texture parameters. As previously mentioned, the herein disclosed method comprises the steps of obtaining sensor data from one or more sensor configured to monitor the surrounding environment of the vehicle. The method uses the sensor data for both determining a surface flatness and the surface texture of at least one portion of the surrounding environment of the vehicle. Moreover, the method utilizes independent models/algorithms when determining the surface flatness and the surface texture. However, it should be noted that different data sets of the sensor data may be used for each estimation/determination. Each algorithms generates an output (MF/MR in FIG. 4) that may be stored in cells of an occupancy grid (or other representation) for each time step t. Moreover, each of these two "grids" are then "time filtered" independently. As mentioned, the algorithms used for determining the surface flatness and the surface texture may generate an output in the form of a probability that a cell in each respective occupancy grid is flat and has a "road-like" texture.

There are a number of known methods that estimate the "flatness" of a surface, but many of them require a number of restrictions when performing the estimation. For instance, some methods for estimating the flatness of a surface need to be performed column-wise in an image where the algorithm "stops" at the first non-flat object. Thus, this would mean that if a smaller object would be present in front of the vehicle, then such solutions would not analyse anything behind that smaller object. Thus, even if the vehicle could have "easily" manoeuvred around smaller object (e.g. a tire), knowing that the area behind it is "drivable", the automated driving system of the vehicle may still be forced to stop and request a hand-over due to the uncertainty. In the herein proposed method, the first algorithm is configured to analyse and determined the surface flatness of the whole visible surface in front of or around the vehicle, i.e. beyond small objects on the surface, assuming that the area beyond the object is detectable by the sensors of the vehicle.

Moreover, the independency of each of the algorithms brings a series of advantages in relation to previously known solutions. As mentioned, in a standard model, the determination of a flat surface may be limited to the appearance of e.g. a tire or other small objects on the road. In the herein presented solution, the determination of the flat surface is not necessarily stopped by the encounter of an object lying in front of the vehicle. Instead, another independent algorithm determining the texture of the surface will further help to determine whether the object needs to be considered or whether the first algorithm should ignore the object and continue beyond it. For example, a speed bump may be indicated in the sensor data, the first algorithm (surface flatness model) may indicate that that area is not "drivable" since it is not "flat". However, by utilizing the texture measurement, one may conclude from both measurements that a speed bump is observed and that the area is a "drivable space". Similarly, a concrete barrier may be indicated in the sensor data, the second algorithm (surface texture model) may indicate that this area is "drivable" since it may be construed as having a "road-like appearance" (c.f. concrete pavement). However, by utilizing the surface flatness measurement (i.e. the first algorithm), one may conclude from both measurements that a concrete barrier is observed and that the associated area is not a "drivable space".

Moving on, assuming that an occupancy grid framework is used for forming the model representations. Then, each cell of the separate occupancy grids of the two model representations (one for each of the surface flatness and the surface texture) will contain a probability value of whether the surface is flat or road-like depending on the output of each algorithm. The fusion FD is performed at each time step t but is not saved for the next time step. There is no need in saving the fused result in real time because the two occupancy grids/representations/layers store their measurements (TF/TR) for every time step t allowing the possibility of re-creating the fusion FD at a later stage. This is one of the advantages of time filtering prior to the data fusion. In particular when using two different time filtering grids/layers. Another advantage is that if after fusion FD, the information obtained is not sufficiently reliable or precise, and the information in the individual time-filtered model representations may be used as to confirm or detect any kind of errors in the measurements or algorithms.

In other words, each algorithm generates an output, i.e. a result; in an occupancy grid or other representation at each time step t and each of these two grids/representations/layers are time filtered independently. They may for example contain the probability values for each cell in each grid being "flat" or "road-like". The fusion is performed at each time step but is not saved for a subsequent time step since it can always be recreated from the two individual time filtered occupancy grids. The primary computations estimating whether the vehicle can drive along the planned path may at first hand be based on the fused grid. In other words, the defining of the at least one portion being a drivable space may at first hand be based on the fusion result. Then, if more information is needed for certain cells/areas, the individual surface flatness parameters or the individual surface texture parameters may be used.

Common with the process depicted of FIG. 3, the process of FIG. 4 is also based on that the determination of the surface flatness and that the determination of the surface texture are applied independently of each other when defining the drivable space. As a last step, the at least one portion of the surrounding environment is defined as drivable space based on the determined surface flatness and determined surface texture.

As mentioned, the herein disclosed methods may use an occupancy grid framework that "maps" the drivable space around and/or in front of the vehicle. In other words, each of the two different model representations associated with the first and second algorithms, respectively, may be in the form of an independent occupancy grid layer in the occupancy grid framework representing the surrounding environment of a vehicle based on the obtained sensor data.

Executable instructions for performing these functions are, optionally, included in a non-transitory computer-readable storage medium or other computer program product configured for execution by one or more processors.

Figure 5:
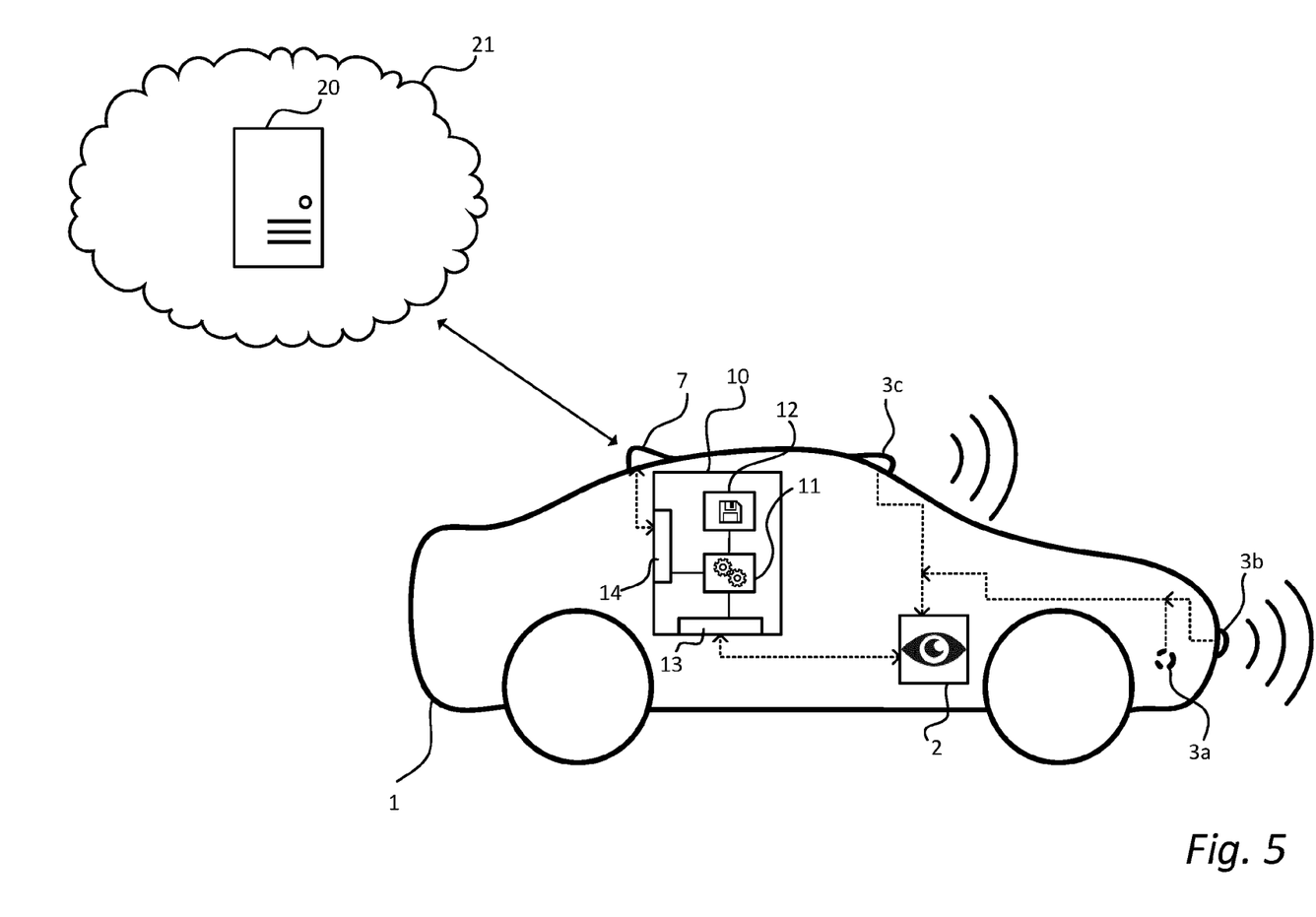
FIG. 5 is a schematic side view of a vehicle comprising a control device in accordance with an embodiment of the present disclosure.

FIG. 5 is a schematic side view of a vehicle 1 comprising a control device 10 estimating a drivable space in a surrounding environment of the vehicle 1. The vehicle 1 further comprises a perception system 2 comprising a plurality of different sensors 3a-c. A perception system 2 is in the present context to be understood as a system responsible for acquiring raw sensor data from on sensors 3a, 3b, 3c such as cameras, LIDARs and RADARs, ultrasonic sensors, and converting this raw data into scene understanding.

The control device 10 comprises one or more processors 11, a memory 12, a sensor interface 13 and a communication interface 14. The processor(s) 11 may also be referred to as a control circuit 11 or control circuitry 11. The control circuitry 11 is configured to execute instructions stored in the memory 12 to perform a method for estimating a drivable space in a surrounding environment of a vehicle according to any one of the embodiments disclosed herein. Stated differently, the memory 12 of the control device 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices.

In more detail, the control circuitry 11 is configured to obtain sensor data from one or more sensors 3a, 3b, 3c for monitoring the surrounding environment of the vehicle 1. The control circuitry 11 is further configured determine, by means of a first algorithm, a surface flatness of at least one portion of the surrounding environment based on the obtained sensor data in order to obtain a surface flatness parameter. The determined surface flatness parameter is indicative of a presence of a bump, indentation, and/or object on the at least one portion of the surrounding environment. Furthermore, control circuitry 11 is configured to determine, by means of a second algorithm, a surface texture of the at least one portion of the surrounding environment based on the obtained sensor data in order to obtain a surface texture parameter. The determined surface texture parameter is indicative of a presence of a road-like appearance of the at least one portion of the surrounding environment. Further, control circuitry 11 is configured to generate a control signal indicative of the presence of drivable space on the at least one portion of the surrounding environment based on the obtained surface flatness parameter and the obtained surface texture parameter.

Further, the vehicle 1 may be connected to external network(s) 21 via for instance a wireless link (e.g. for receiving updates or executing some or all of the method steps). The same or some other wireless link may be used to communicate with other vehicles in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the control device 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the sensor interface 13 may also provide the possibility to acquire sensor data directly or via dedicated sensor control circuitry 2 in the vehicle. The communication/antenna interface 14 may further provide the possibility to send output to a remote location (e.g. cloud server 20) by means of the antenna 7. Moreover, some sensors in the vehicle may communicate with the control device 10 using a local network setup, such as CAN bus, I2C, Ethernet, optical fibres, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

Accordingly, it should be understood that parts of the described solution may be implemented either in the vehicle 1, in a system 20 located external the vehicle, or in a combination of internal and external the vehicle; for instance in a server 20 in communication with the vehicle, a so called cloud solution. For instance, sensor data may be sent to an external system 20 and that system performs the steps to fuse measurements from a plurality of different vehicles 1, and transmits the result to each vehicle 1.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the disclosure may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. For example, the steps of determining surface flatness and surface texture may be interchanged or done concurrently. Such variation will depend on the software and hardware systems chosen and on designer choice. It will also be understood that, although the term first, second, etc. may be used herein to describe various elements, these elements should not be limited by these terms. These terms are only used to distinguish one element from another. For example, a first algorithm could be termed a second algorithm, and, similarly, a second algorithm could be termed a first algorithm, without departing from the scope of the embodiments. The first algorithm and the second algorithm are both algorithms, but they are not the same algorithm.

All such variations are within the scope of the disclosure. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present disclosure. Other solutions, uses, objectives, and functions within the scope of the disclosure as claimed in the below described patent embodiments should be apparent for the person skilled in the art.

The invention claimed is:

1. A method for estimating a drivable space in a surrounding environment of a vehicle, the method comprising:
    obtaining sensor data comprising information about the surrounding environment of the vehicle;
    determining, using a first algorithm, a surface flatness of the surrounding environment of the vehicle based on the obtained sensor data in order to obtain a surface flatness parameter for each of a first plurality of portions of the surrounding environment of the vehicle, wherein each obtained surface flatness parameter is indicative of a presence of a bump, indentation, and/or object on a corresponding portion of the first plurality of portions of the surrounding environment of the vehicle;
    forming a first model representation indicative of the obtained surface flatness parameters of the first plurality of portions of the surrounding environment of the vehicle;
    wherein forming the first model representation comprises:
        for each time sample, updating the surface flatness parameters of a previous time sample based the obtained surface flatness parameters by adding or multiplying the obtained surface flatness parameters to the first model representation of the previous time sample;
    determining, using a second algorithm, a surface texture of the surrounding environment of the vehicle based on the obtained sensor data in order to obtain a surface texture parameter for each of a second plurality of portions of the surrounding environment of the vehicle, wherein each obtained surface texture parameter is indicative of a presence of a road surface on a corresponding portion of the second plurality of portions of the surrounding environment of the vehicle;
    forming a second model representation indicative of the obtained surface texture parameters of the second plurality of portions of the surrounding environment of the vehicle;
    wherein forming the second model representation comprises:
        for each time sample, updating the surface texture parameters of a previous time sample with the obtained surface texture parameters by adding or multiplying the obtained surface texture parameters to the second model representation of the previous time sample;

storing, in a separate layer or a separate counter, the obtained surface flatness parameters and the determined surface texture parameters at each time sample;

fusing the obtained surface flatness parameters and the obtained surface texture parameters in order to obtain a combined estimation of the presence of drivable space in the surrounding environment, wherein fusing the determined surface flatness parameters with the determined surface texture parameters is performed where the first and second model representations overlap;

wherein the updating of the surface flatness parameters and the updating of the surface texture parameters is performed before fusing the obtained surface flatness parameter-parameters and the obtained surface texture parameters;

generating a control signal indicative of the presence of drivable space of the surrounding environment based on the combined estimation of the presence of drivable space; and controlling driving of the vehicle in the drivable space of the surrounding environment based on the combined estimation of the presence of drivable space.

2. The method according to claim 1, wherein the step of determining the surface flatness is based on sensor data obtained from at least one of a Laser Imaging Detection and Ranging, LIDAR, device, a monocular camera, a stereo camera and a radar device.

3. The method according to claim 1, wherein the step of determining the surface texture is based on sensor data obtained information from at least one of a Laser Imaging Detection and Ranging, LIDAR, device, stereo camera and a monocular camera.

4. The method according to claim 1, wherein the first model representation and the second model representation are based on an occupancy grid framework such that obtained surface flatness parameters and the obtained surface texture parameters are updated in separate layers or grids in an occupancy grid framework.

5. The method according to claim 1, further comprising:
forming a combined model representation indicative of the obtained estimation of the presence of drivable of a third plurality of portions of the surrounding environment of the vehicle; and
for each time sample, updating the combined estimation of the presence of drivable space of a previous time sample with the obtained combined estimation of the presence of drivable space.

6. A non-transitory computer-readable storage medium storing one or more instructions configured to be executed by one or more processors of a vehicle processing system, the one or more instructions for performing the method according to claim 1.

7. A control device for estimating a drivable space in a surrounding environment of a vehicle, the control device comprising:
at least one processor configured to:
obtain sensor data comprising information about the surrounding environment of the vehicle;
determine using a first algorithm, a surface flatness of the surrounding environment of the vehicle based on the obtained sensor data in order to obtain a surface flatness parameter for each of a first plurality of portions of the surrounding environment of the vehicle, wherein each obtained surface flatness parameter is indicative of a presence of a bump, indentation, and/or object on a corresponding portion of a first plurality of portions of the surrounding environment of the vehicle;

form a first model representation indicative of the obtained surface flatness parameters of the first plurality of portions of the surrounding environment of the vehicle;

wherein forming the first model representation comprises:
for each time sample, updating the surface flatness parameters of a previous time sample based the obtained surface flatness parameters by adding or multiplying the obtained surface flatness parameters to the first model representation of the previous time sample;

determine using a second algorithm, a surface texture of the surrounding environment of the vehicle based on the obtained sensor data in order to obtain a surface texture parameter for each of a second plurality of portions of the surrounding environment of the vehicle, wherein each obtained surface texture parameter is indicative of a presence of a road surface on a corresponding portion of the second plurality of portions of the surrounding environment of the vehicle;

form a second model representation indicative of the obtained surface texture parameters of the second plurality of portions of the surrounding environment of the vehicle;

wherein forming the second model representation comprises
for each time sample, updating the surface texture parameters of a previous time sample with the obtained surface texture parameters by adding or multiplying the obtained surface texture parameters to the second model representation of the previous time sample;

store, in a separate layer or a separate counter, the obtained surface flatness parameters and the determined surface texture parameters at each time sample;

fuse the obtained surface flatness parameters and the obtained surface texture parameters in order to obtain a combined estimation of the presence of drivable space in the surrounding environment, wherein fusing the determined surface flatness parameters with the determined surface texture parameters is performed where the first and second model representations overlap;

wherein the updating of the surface flatness parameters and the updating of the surface texture parameters is performed before fusing the obtained surface flatness parameters and the obtained surface texture parameters;

generate a control signal indicative of the presence of drivable space of the surrounding environment based on the combined estimation of the presence of drivable space; and control driving of the vehicle in the drivable space of the surrounding environment based on the combined estimation of the presence of drivable space.

8. A vehicle comprising:
a perception system comprising one or more sensors adapted to monitor a surrounding environment of the vehicle; and
a control device for estimating a drivable space in a surrounding environment of a vehicle, the control device comprising:
at least one processor configured to:
obtain sensor data comprising information about the surrounding environment of the vehicle;
determine, using a first algorithm, a surface flatness of the surrounding environment of the vehicle based on the obtained sensor data in order to obtain a surface flatness parameter for each of a first plurality of portions of the surrounding environment of the vehicle, wherein each obtained surface flatness parameter is indicative of a presence of a bump, indentation, and/or object on a corresponding portion of a first plurality of portions of the surrounding environment of the vehicle;

form a first model representation indicative of the obtained surface flatness parameters of the first plurality of portions of the surrounding environment of the vehicle;

wherein forming the first model representation comprises:
  for each time sample, updating the surface flatness parameters of a previous time sample based the obtained surface flatness parameters by adding or multiplying the obtained surface flatness parameters to the first model representation of the previous time sample;

determine, using a second algorithm, a surface texture of the surrounding environment of the vehicle based on the obtained sensor data in order to obtain a surface texture parameter for each of a second plurality of portions of the surrounding environment of the vehicle, wherein each obtained surface texture parameter is indicative of a presence of a road surface on a corresponding portion of the second plurality of portions of the surrounding environment of the vehicle;

form a second model representation indicative of the obtained surface texture parameters of the second plurality of portions of the surrounding environment of the vehicle;

wherein forming the second model representation comprises
  for each time sample, updating the surface texture parameters of a previous time sample with the obtained surface texture parameters by adding or multiplying the obtained surface texture parameters to the second model representation of the previous time sample;

store, in a separate layer or a separate counter, the obtained surface flatness parameters and the determined surface texture parameters at each time sample;

fuse the obtained surface flatness parameters and the obtained surface texture parameters in order to obtain a combined estimation of the presence of drivable space in the surrounding environment, wherein fusing the determined surface flatness parameters with the determined surface texture parameters is performed where the first and second model representations overlap;

wherein the updating of the surface flatness parameters and the updating of the surface texture parameters is performed before fusing the obtained surface flatness parameters and the obtained surface texture parameters;

generate a control signal indicative of the presence of drivable space of the surrounding environment based on the combined estimation of the presence of drivable space; and control driving of the vehicle in the drivable space of the surrounding environment based on the combined estimation of the presence of drivable space.

* * * * *